United States Patent
Smith et al.

(10) Patent No.: US 10,298,906 B2
(45) Date of Patent: May 21, 2019

(54) DERMAL CAMERA ATTACHMENT

(71) Applicant: Verily Life Sciences LLC, Mountain View, CA (US)

(72) Inventors: Peter Smith, Pacifica, CA (US); Eric Peeters, San Jose, CA (US); Benjamin Krasnow, Redwood City, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 280 days.

(21) Appl. No.: 15/258,665

(22) Filed: Sep. 7, 2016

(65) Prior Publication Data
US 2018/0054565 A1 Feb. 22, 2018

Related U.S. Application Data

(60) Provisional application No. 62/376,769, filed on Aug. 18, 2016.

(51) Int. Cl.
*H04N 13/156* (2018.01)
*G03B 17/56* (2006.01)
(Continued)

(52) U.S. Cl.
CPC ......... *H04N 13/156* (2018.05); *G03B 11/045* (2013.01); *G03B 17/565* (2013.01);
(Continued)

(58) Field of Classification Search
CPC .................................................. G03B 11/045
See application file for complete search history.

(56) References Cited

U.S. PATENT DOCUMENTS 5,745,803 A * 4/1998 Ito ........................... G02B 7/10
396/534
6,243,540 B1 * 6/2001 Kume .................. G03B 11/045
359/611
(Continued)

FOREIGN PATENT DOCUMENTS

JP 2008129446 A 6/2008
WO WO2015060376 A1 4/2015

OTHER PUBLICATIONS

Makayama Movie Mount: http://web.archive.org/web/20120123214455/ http://www.makayama.com/moviemountpix.html (Year: 2012).*
(Continued)

*Primary Examiner* — Clayton E. LaBalle
*Assistant Examiner* — Dennis Hancock
(74) *Attorney, Agent, or Firm* — Christensen O'Connor Johnson Kindness PLLC (57) ABSTRACT

A camera attachment apparatus for attaching to a mobile computing device having an integrated camera includes a house, a slide plate, an aperture, and an illumination system. The housing has a shape to mount on the mobile computing device. The slide plate is disposed within the housing and has a stowed position and a deployed position. The aperture is disposed in the slide plate. The illumination system is disposed on the slide plate. The slide plate is configured to align the aperture over the integrated camera when moved to the deployed position and does not obstruct the integrated camera in the stowed position.

22 Claims, 11 Drawing Sheets

(51) Int. Cl.
  *H04N 5/225* (2006.01)
  *H04N 5/262* (2006.01)
  *H04N 5/232* (2006.01)
  *H04N 5/235* (2006.01)
  *H04N 5/33* (2006.01)
  *G03B 11/04* (2006.01)
  *G06T 7/00* (2017.01)

(52) U.S. Cl.
  CPC .......... *G03B 17/566* (2013.01); *G06T 7/0016* (2013.01); *H04N 5/2252* (2013.01); *H04N 5/2254* (2013.01); *H04N 5/2256* (2013.01); *H04N 5/2354* (2013.01); *H04N 5/23229* (2013.01); *H04N 5/2621* (2013.01); *H04N 5/33* (2013.01); *G03B 2215/0517* (2013.01); *G06T 2207/10024* (2013.01); *G06T 2207/10048* (2013.01); *G06T 2207/30088* (2013.01); *G06T 2207/30096* (2013.01)

(56) References Cited

U.S. PATENT DOCUMENTS

| | | | | |
|---|---|---|---|---|
| 8,224,175 B2* | 7/2012 | Yang | ...................... | G03B 15/05 396/175 |
| 8,509,501 B2* | 8/2013 | Hassebrook | ....... | G01B 11/2513 382/125 |
| 8,588,605 B2* | 11/2013 | Harris | .................... | G02B 27/28 396/544 |
| 9,325,884 B2 | 4/2016 | Fletcher et al. | | |
| 2009/0189972 A1* | 7/2009 | Harris | .................. | A61B 5/0059 348/14.08 |
| 2009/0296221 A1* | 12/2009 | Cheng | .................. | G03B 11/045 359/611 |
| 2015/0062416 A1* | 3/2015 | Vance | .................... | G03B 17/17 348/369 |
| 2015/0355527 A1 | 12/2015 | Takahashi et al. | | |
| 2016/0320588 A1* | 11/2016 | Kindaichi | ................ | G02B 7/16 |
| 2017/0199445 A1* | 7/2017 | Endo | ..................... | G03B 15/05 |

OTHER PUBLICATIONS

Dermlite Connection Kit for Galaxy S5—Dermlite, The World's Best Selling Dermatoscope, accessed Jun. 22, 2016, 3 pages.
Dermlite Connection Kit for iPad Air—Dermlite, The World's Best Selling Dermatoscope, accessed Jun. 22, 2016, 3 pages.
Dermlite Connection Kit for iPhone 6/6s—Dermlite, The World's Best Selling Dermatoscope, accessed Jun. 22, 2016, 3 pages.

* cited by examiner

DERMAL CAMERA ATTACHMENT

CROSS-REFERENCE TO RELATED APPLICATION

This application claims the benefit of U.S. Provisional Application No. 62/376,769 filed on Aug. 18, 2016, the contents of which are incorporated herein by reference.

TECHNICAL FIELD

This disclosure relates generally to camera systems, and in particular but not exclusively, relates to camera systems for acquiring dermal images.

BACKGROUND INFORMATION

Doctors (e.g., primary care providers, dermatologists, etc.) routinely take pictures of patients' skin. Pictures are taken in a variety of conditions (different types of devices, cameras, cell phones, and environments). This results in inconsistent pictures, making it difficult to identify longitudinal changes in patients' skin condition. Furthermore, conventional devices used to take pictures are typically limited in the type of imaging information that can be captured.

One such conventional device is a bulky attachment to a smart phone that fits over the integrated camera of the smart phone. When installed this conventional device obscures the integrated camera and does not permit the acquisition of far field images. In order to access the "normal" far field camera mode, the conventional device must be removed from the smart phone. Furthermore, the light source of this conventional device is not programmable and the device does not provide an integrated and intelligent software tool suite.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for a dermal camera attachment that piggybacks on a mobile computing device and a dermal camera application that installs on the mobile computing device are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Various embodiments of the dermal camera attachment disclosed herein may enable a mobile computing device (e.g., a smart cellular phone, a tablet computer, etc.) having an integrated camera to acquire both near field images of a patient's skin and far field images. The near field images may be acquired using a light shield that not only blocks ambient light to provide a consistent and controlled lighting environment but also provides a fixed offset. The integrated camera may also be used to acquire the far field images both without removal of the dermal camera attachment and without the dermal camera attachment obstructing, or otherwise interfering with, the far field images. The system described herein may further include a dermal camera application that may be installed on the mobile computing device to provide an integrated tools suite for acquiring, cataloging, tracking, analyzing, and even diagnosing the patients' skin conditions all from the convenience of the mobile computing device.

Figure 1A:
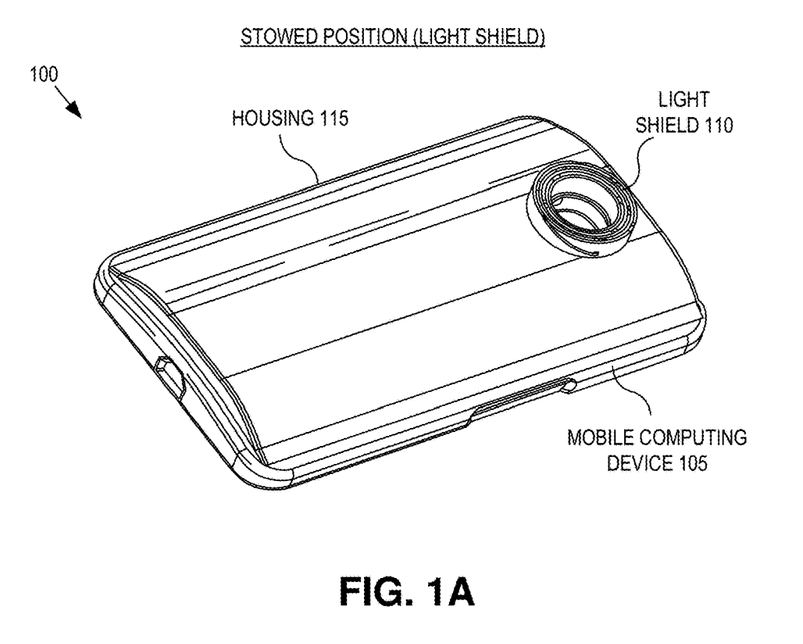
FIGS. 1A and 1B are perspective view illustrations of a dermal camera attachment having a light shield in stowed and deployed positions, in accordance with an embodiment of the disclosure.
Figure 1B:
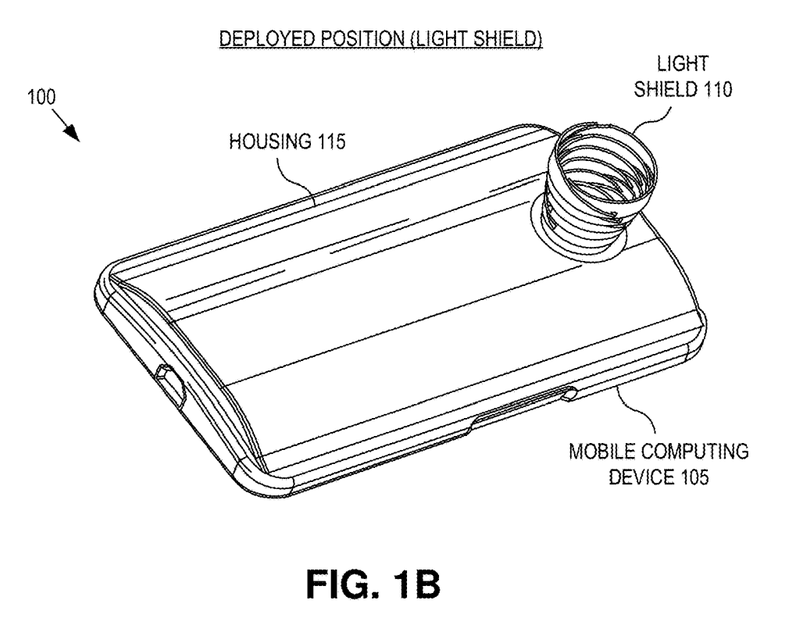

FIGS. 1A and 1B are perspective view illustrations of a dermal camera attachment 100 piggybacking on a mobile computing device 105, in accordance with an embodiment of the disclosure. The illustrated embodiment of dermal camera attachment 100 includes a light shield 110 and a housing 115. Mobile computing device 105 may be implemented as a smart cellular phone, a tablet computer, or other mobile devices. Housing 115 "piggybacks" by mechanically and/or magnetically attaching to, or otherwise holding onto, mobile computing device 105 when in use. In one embodiment, dermal camera attachment 100 is removable.

FIGS. 1A and 1B illustrate an embodiment of light shield 110 that is telescoping. In FIG. 1A, light shield 110 is collapsed or retracted into a stowed position to facilitate capture of far field images using the integrated camera of mobile computing device 105. When stowed, light shield 110 does not obstruct or otherwise interfere with the acquisition of the far field images even though dermal camera attachment 100 remains mounted to mobile computer device 105. In FIG. 1B, light shield is extended into the deployed position for acquiring near field images. In the deployed position, the light shield is able to block ambient light when pressed up against a region of interest, e.g. to provide a consistent and controlled environment for acquiring near field pictures. These near field pictures may be close up images of a patient's skin (e.g., lesions). Light shield 110 may further provide a fixed offset when light shield 110 pressed up against a region of interest ("ROI"), e.g. for acquiring consistent near field images over time. A fixed offset, in relation to a region of interest, may be understood as a fixed distance between the region of interest and an image sensor of the integrated camera.

In the illustrated embodiment, light shield 110 is deployed by a user rotating light shield 110 and stowed by a corresponding counter rotation. In yet other embodiments (not illustrated), the telescoping embodiment of light shield 110 illustrated in FIGS. 1A and 1B may be replaced with a disposable fixed length light shield that is stowed by removal and deployed by attaching it into position over the integrated camera of mobile computing device 105. This disposable fixed length light shield may also operate as a handle for applying a force that actuates the internal components in and out of the optical path of the integrated camera. Additionally, in one embodiment, a barrier sticker having an annular shape may be adhered to the distal end of the deployed light shield 110 to provide a sanitary barrier between the patient and light shield 110. The barrier sticker can be a removable item that is discarded after use on each patient.

Figure 2A:
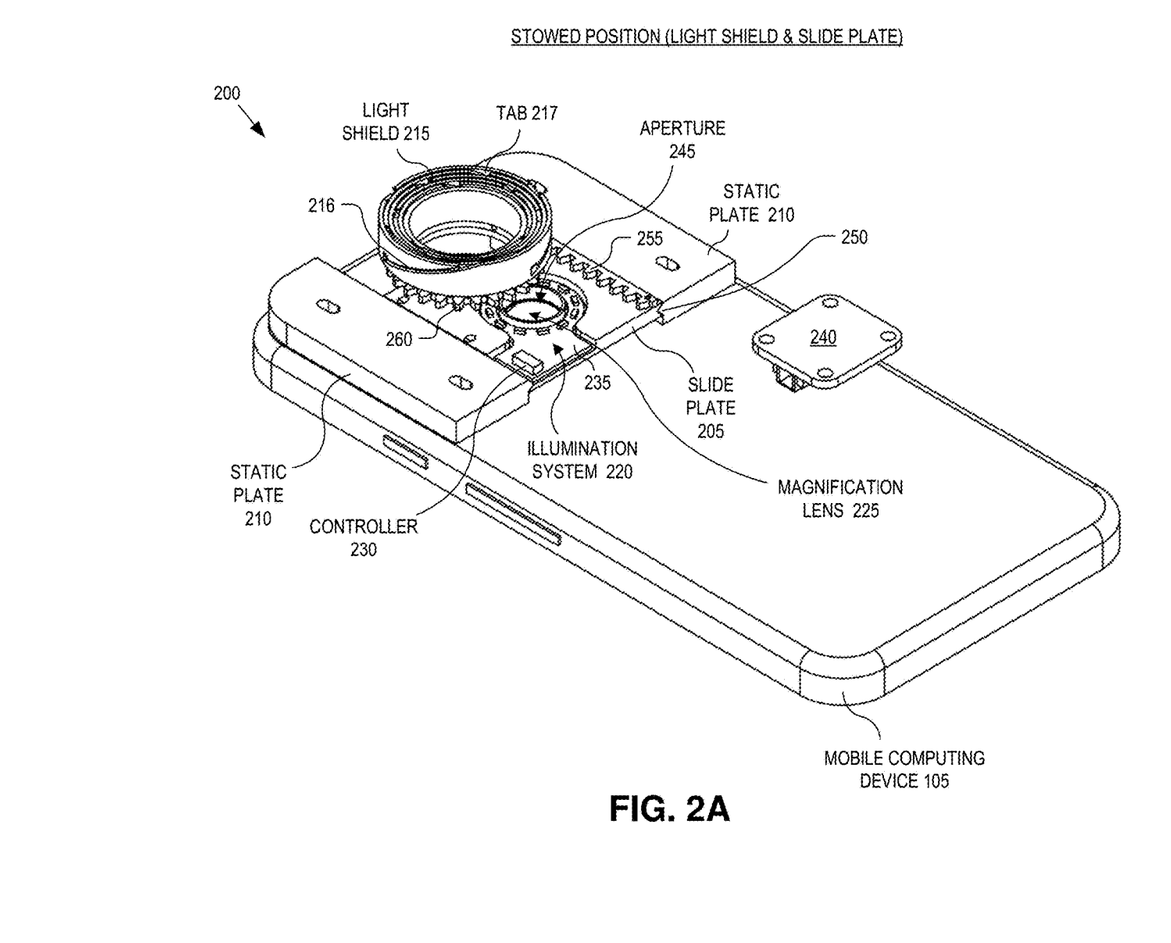
FIG. 2A is a perspective view illustration of internal components of a dermal camera attachment in a stowed position, in accordance with an embodiment of the disclosure.

FIGS. 2A-2E all illustrate internal components of a dermal camera attachment 200, in accordance with an embodiment of the disclosure. Dermal camera attachment 200 illustrates one possible implementation of the internal components of dermal camera attachment 100. FIG. 2A is a perspective view illustration of the internal components when dermal camera attachment 200 is in a stowed position. FIGS. 2B, 2C, 2D, and 2E are plan and side view illustrations of the internal components also when dermal camera attachment 200 is in the stowed position.

The illustrated embodiment of dermal camera attachment 200 includes a slide plate 205, static plates 210, a light shield 215, an illumination system 220, a magnification lens 225, a controller 230, a circuit board 235, and a port 240. An aperture 245 is disposed in slide plate 205 and circuit board 235. Magnification lens 225 is disposed within aperture 245. In the illustrated embodiment, circuit board 235 is mounted on and rides with slide plate 205. Illumination system 220 and controller 230 are disposed on circuit board 235 and thus in turn mount to slide plate 205 to move therewith. The illustrated embodiment of illumination system 220 includes a plurality of light emitting diode ("LED") sources encircling a perimeter of aperture 245 forming an LED light ring. In various embodiments, the LED sources may include white light LEDs for acquiring near field color images, infrared ("IR") LEDs for acquiring near field IR images, and/or ultraviolet ("UV") LEDs for acquiring UV near field images.

Slide plate 205 is configured to move linearly back-and-forth between static plates 210. In the illustrated embodiment, a track 250 is disposed in the sides of static plate 210 and slide plate 205. Slide plate 205 slides along track 250 between the stowed and deployed positions. In the illustrated embodiment, track 250 is a dovetail track, though other track configurations (e.g., dado track, etc.) may be used. In the illustrated embodiment, the linear slide motion of slide plate 205 relative to static plates 210 is actuated by a rotation motion of light shield 215, which is coupled to slide plate 210 via a rack gear 255 and a pinion gear 260. Rack gear 255 is mounted to slide plate 205. Pinion gear 255 engages both light shield 215 and rack gear 255. A rotation of light shield 215 rotates pinion gear 255, which drives slide plate 205 linearly along track 250 between the deployed and stowed positions. As illustrated in FIGS. 2B-2E, when slide plate 205 is moved to the stowed position, illumination system 220 and magnification lens 225 are removed from the optical path of the integrated camera thereby leaving the integrated camera of mobile computing device 105 unobstructed for acquiring far field images while dermal camera attachment 200 is still attached.

Figure 2B:
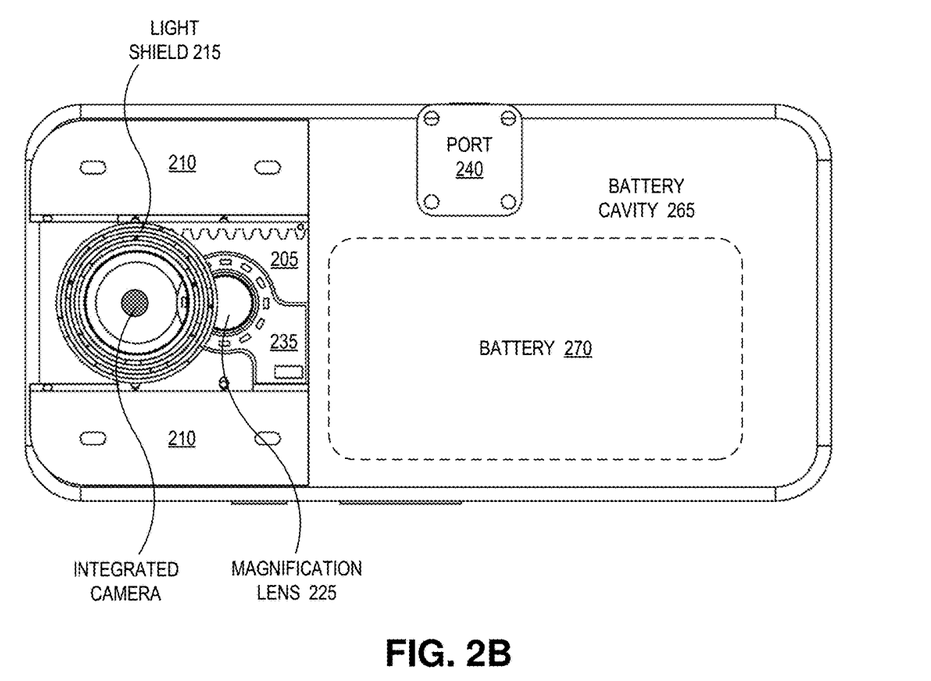
FIGS. 2B and 2C are plan and side view illustrations of internal components of a dermal camera attachment in a stowed position, in accordance with an embodiment of the disclosure.
Figure 2C:
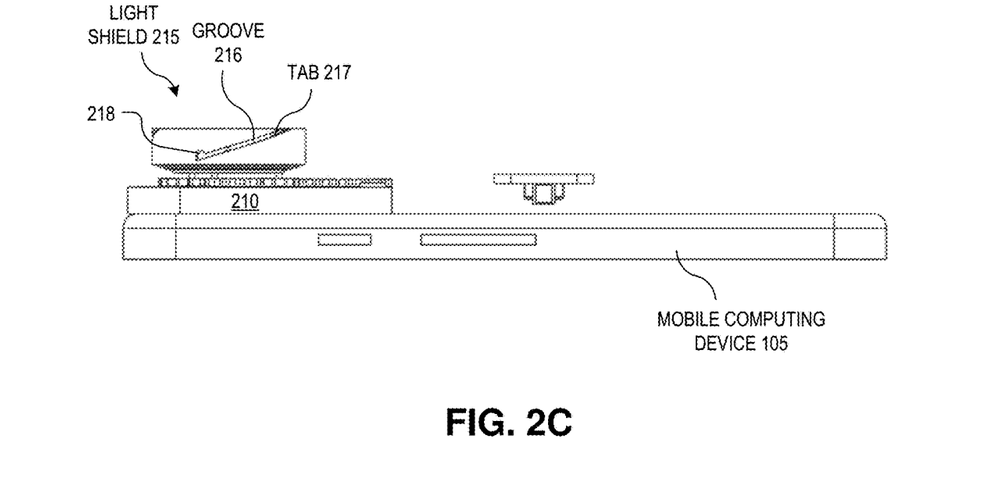

Referring to FIGS. 2A and 2C, light shield 215 is deployed by the user applying a rotation motion to light shield 215. Rotation causes the concentric rings of light shield 215 to telescope outward to the deployed position (illustrated in FIG. 1B). Each concentric ring includes an inclined groove 216 in which a tab 217 from the next inner concentric ring tracks. A rotation motion causes tabs 217 to slide within their respect inclined grooves 216 to either expand or collapse light shield 215. A stop 218 at the bottom of each inclined groove 216 locks light shield 215 in the deployed position. Light shield 215 may be fabricated of plastic, metal, a combination thereof, or otherwise. In one embodiment, light shield 215 is a flat black color to reduce reflections/glare.

Figure 2D:
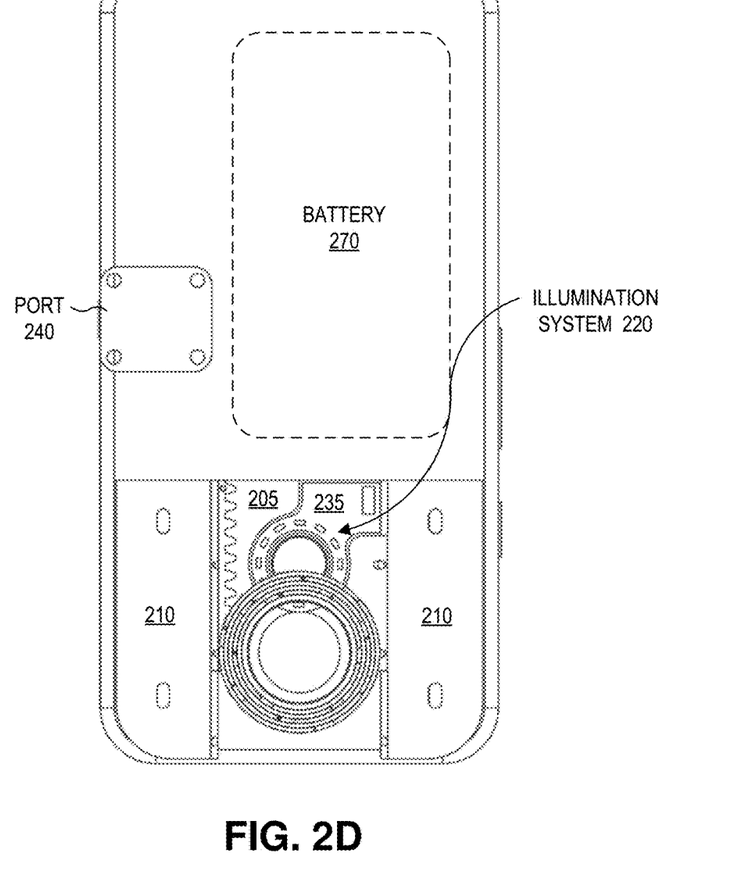
FIGS. 2D and 2E are plan and side view illustrations of internal components of a dermal camera attachment in a stowed position, in accordance with an embodiment of the disclosure.
Figure 2E:
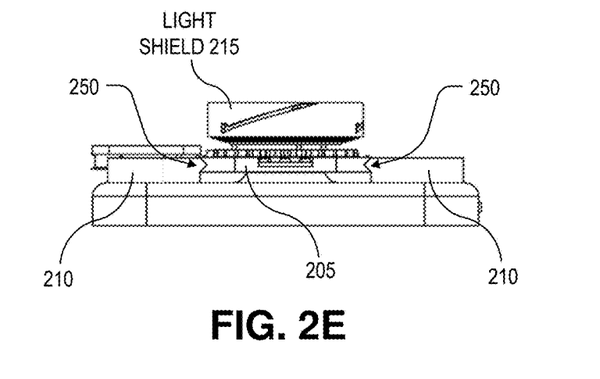

FIGS. 2B and 2D illustrate how the housing (e.g., housing 115) of dermal camera attachment 200 may form a battery cavity 265 in which a battery 270 may be disposed. In one embodiment, battery 270 may be included for powering the internal electronics on circuit board 235 (e.g., illumination system 220, controller 230). In this integrated battery embodiment, battery 270 may be charged via port 240. Thus, dermal camera attachment 200 can, but need not, be removed from mobile computing device 105 when charging battery 270. In other embodiments, the internal electronics on circuit board 235 may be directly coupled to and powered by port 240 thereby omitting the need for battery 270. In embodiments that do not included battery 270, port 240 may be coupled to a port on mobile computing device 105 and powered directly off the system battery of mobile computing device 105. Housing 115 may be fabricated of plastic, metal, a combination thereof, or otherwise.

Port 240 may operate not only as a charging port, but may also serve as a communication port. In one embodiment, port 240 is coupled to a data port on mobile computing device 105 to provide hardwired communications between controller 230 and a dermal camera application installed on mobile computing device 105. In yet other embodiments, controller 230 may communicate with mobile computing device 105 wirelessly (e.g., Bluetooth, wifi, near field communication, etc.), optically (e.g., via the flash on mobile computing device 105), audibly (via a speaker on mobile computing device 105), or a combination thereof.

Figure 3A:
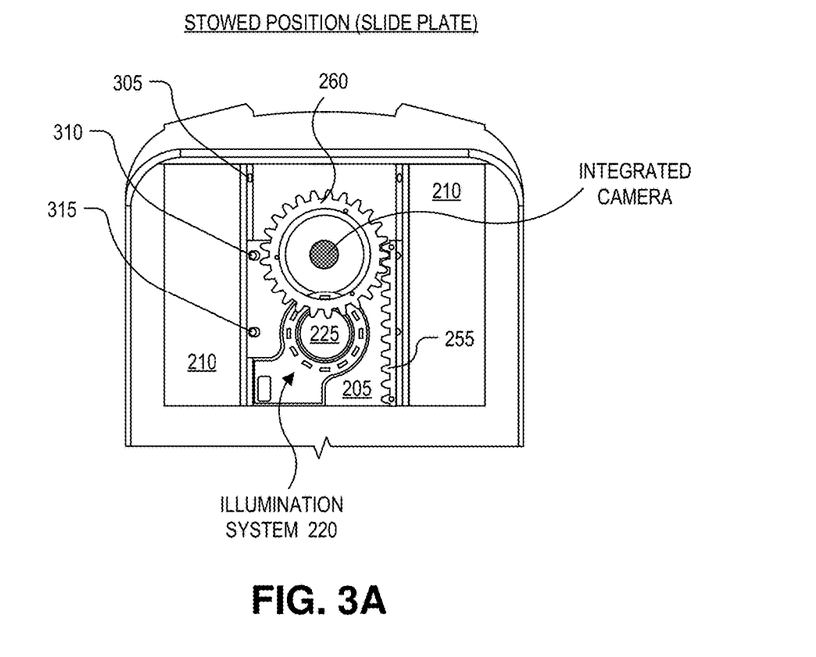
FIG. 3A is a close up illustration of a slide plate of a dermal camera attachment in a stowed position, in accordance with an embodiment of the disclosure.
Figure 3B:
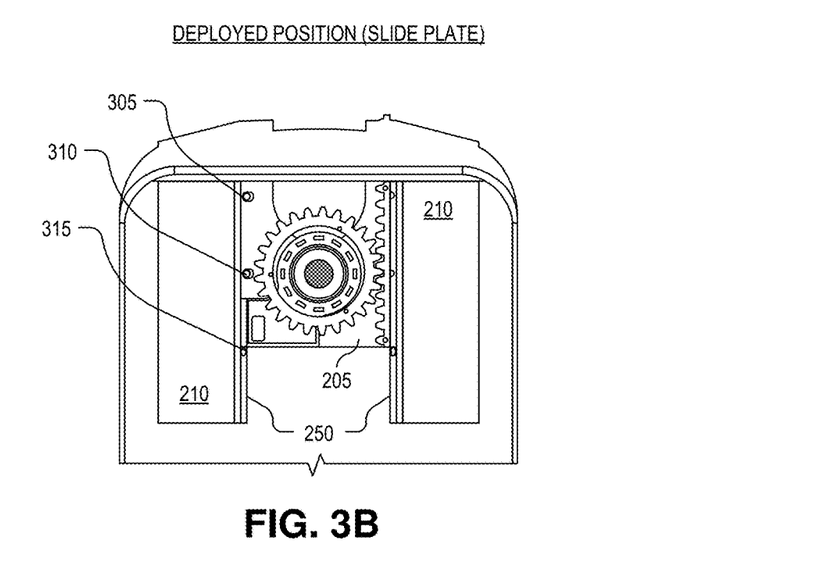
FIG. 3B is a close up illustration of a slide plate of a dermal camera attachment in a deployed position, in accordance with an embodiment of the disclosure.

FIGS. 3A and 3B illustrate the internal mechanical operation of slide plate 205, in accordance with an embodiment of the disclosure. FIG. 3A is a close up illustration of slide plate 205 in the stowed position while FIG. 3B is a close up of slide plate 205 in the deployed position. As illustrated, pinion gear 260 meshes with rack gear 255. A rotation of pinion gear 206 causes slide plate 205 to slide back-and-forth along track 250 between the stowed and deployed positions. When moved to the stowed position (FIG. 3A), magnification lens 225 is moved out of the optical path of the integrated camera. When moved to the deployed position (FIG. 3B), magnification lens 225 is aligned with the integrated camera for acquiring near field images.

The embodiment illustrated in FIGS. 3A and 3B further include activation switches for activating and deactivating illumination system 220. In one embodiment, the activation switches include magnets 305, 310, and 315 disposed on the left static plate 210, which align with corresponding magnets on slide plate 205. These magnets hold slide plate 205 in either the stowed or deployed position. In one embodiment, controller 230 is coupled to the magnetic switches to identify whether slide plate 205 is in the stowed or deployed position. In one embodiment, controller 230 automatically enables illumination system 220 in the deployed position and automatically disables illumination system 220 in the stowed position.

Figure 4A:
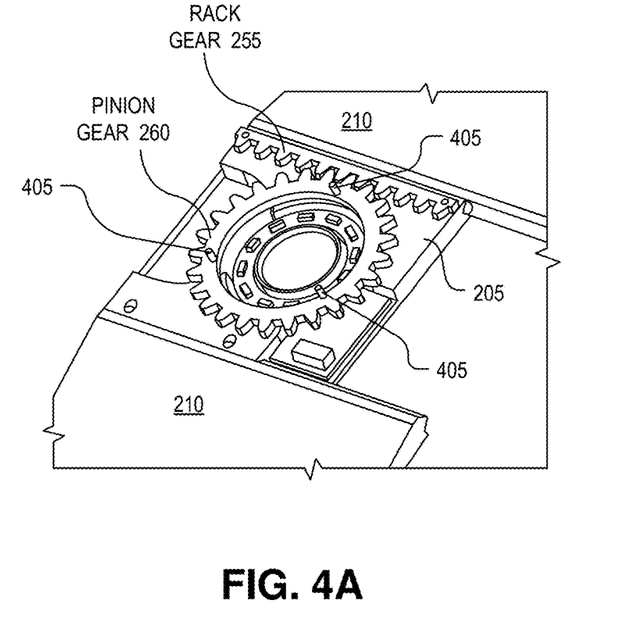
FIG. 4A is a close up perspective illustration of a slide plate of a dermal camera attachment showing pins on a pinion gear for engaging a telescoping light shield, in accordance with an embodiment of the disclosure.
Figure 4B:
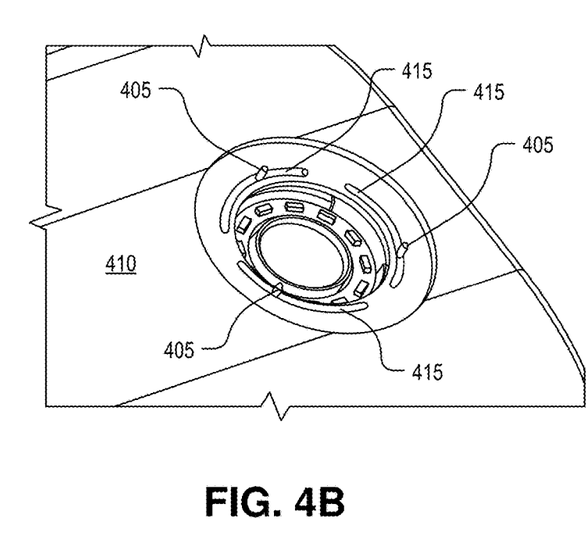
FIG. 4B is a close up perspective illustration of a dermal camera attachment showing pins extending through a housing for engaging a telescoping light shield, in accordance with an embodiment of the disclosure.

FIGS. 4A & 4B illustrate an example of how light shield 215 may engage and mount to pinion gear 260, in accordance with an embodiment of the disclosure. As illustrated in FIG. 4A, pins 405 extend from pinion gear 260. Pins 405 couple into corresponding recesses or holes on the bottom side of light shield 215 and hold tight using a friction fit (for illustrative purposes, light shield 215 is not shown in FIG. 4A or 4B). FIG. 4B illustrates how pins 405 may protrude through slots 415 in housing 410 of the dermal camera attachment, in accordance with an embodiment of the disclosure. Pins 405 may therefore protrude through slots 415 in housing 410 whilst coupling into corresponding recesses or holes on the bottom side of light shield 215. Slots 415 may have a curved elongation that permits light shield 215 (or 110) to be rotated.

Figure 4C:
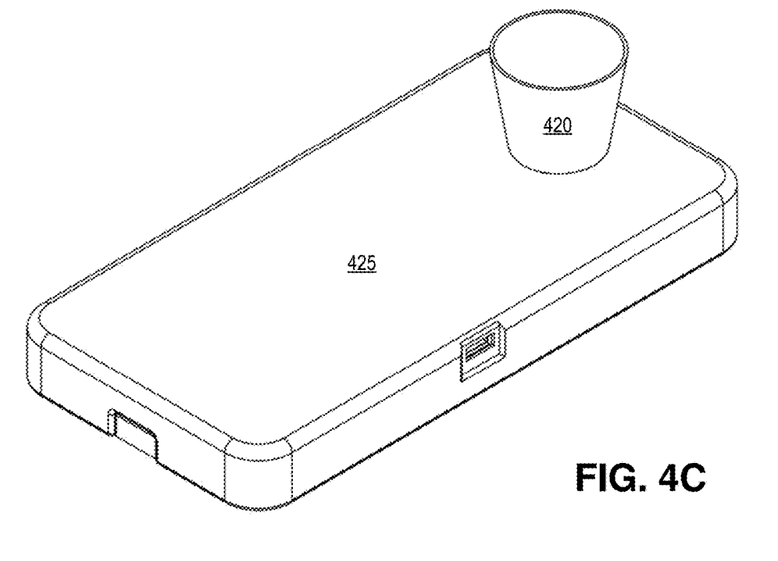
FIGS. 4C-F illustrate a dermal camera attachment having a disposable fixed length light shield, in accordance with an embodiment of the disclosure.
Figure 4D:
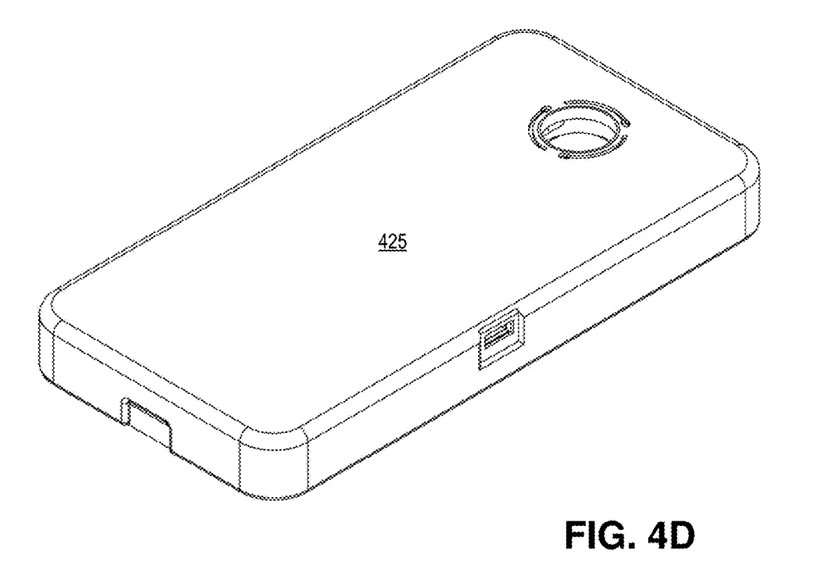
Figure 4E:
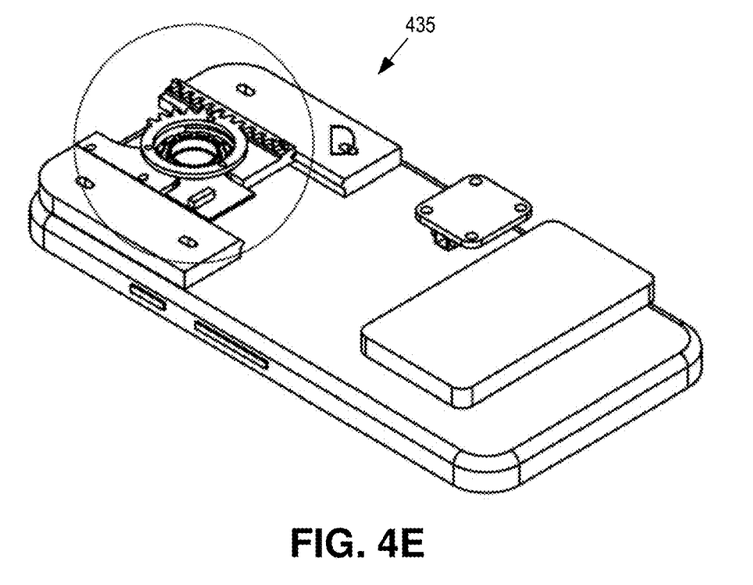
Figure 4F:
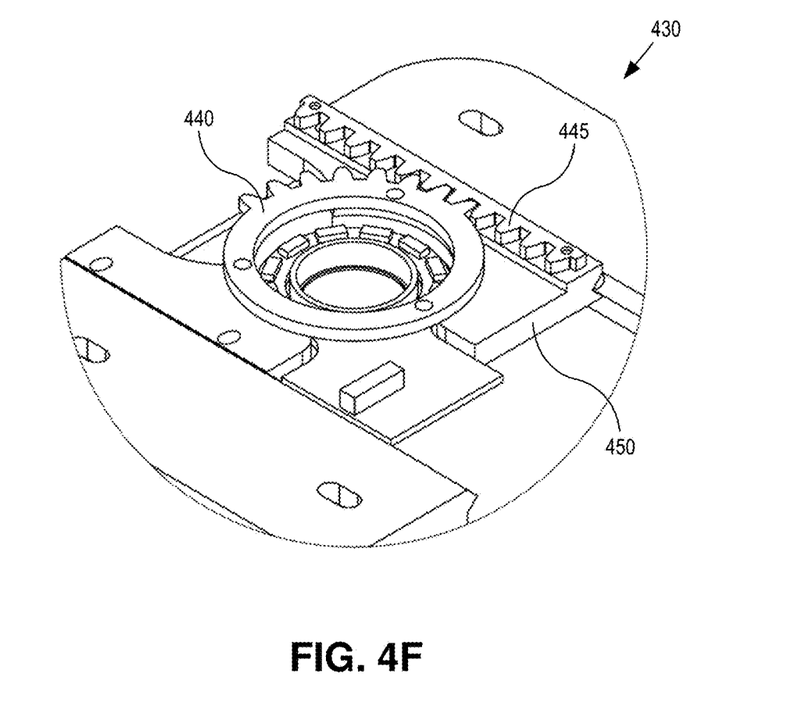

In other embodiments, light shield 215 (or 110) may be implemented as a disposable fixed length light shield. In such embodiments, the light shield may also operate as a handle upon which a force applied by the user causes slide plate 205 to slide back-and-forth between the deployed and stowed position. FIGS. 4C-4F illustrate an example disposable fixed length light shield embodiment. FIGS. 4C and 4D illustrate how disposable fixed length light shield 420 can be removed from housing 425. FIG. 4F is a close up illustration of a portion 430 of the internal components 435 of a disposable fixed length light shield embodiment. As illustrated, disposable fixed length light shield 420 mounts to a pinion gear 440 that engages a rack gear 445. A rotary motion applied to disposable fixed length light shield 420 is coupled through pinion gear 440 and rack gear 445 to drive slide plate 450 between a deployed and stowed position in a manner similar to the telescoping light shield embodiment described above.

In other disposable fixed length light shield embodiments, pinion gear 260 and rack gear 255 may be omitted and pins 405 mounted directly to slide plate 205. Furthermore, slots 415 in housing 410 may be straight allowing for a linear back-and-forth motion of the light shield to drive the slide plate between the stowed and deployed positions.

Figure 5:
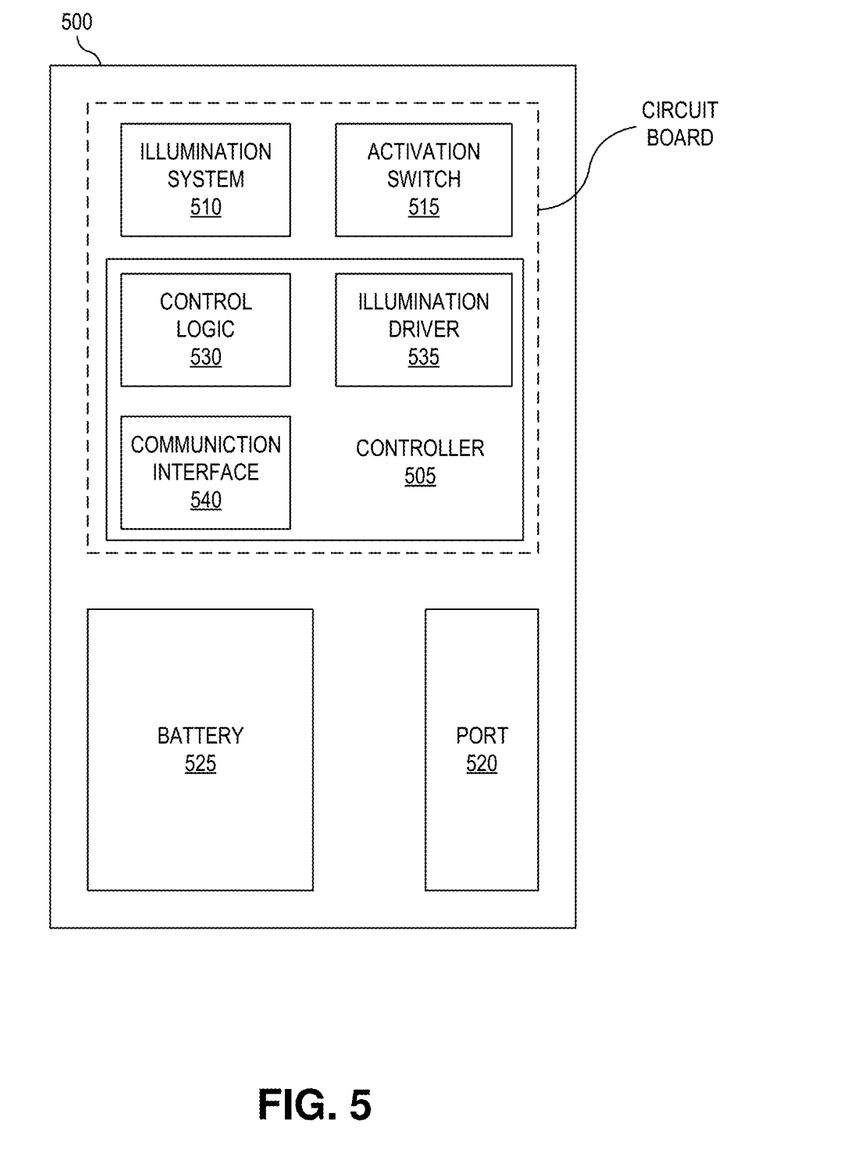
FIG. 5 is a functional block diagram illustrating electronic components of a dermal camera attachment, in accordance with an embodiment of the disclosure.

FIG. 5 is a functional block diagram illustrating electronic components of a dermal camera attachment 500, in accordance with an embodiment of the disclosure. Dermal camera attachment 500 is one possible implementation of the electronic components of dermal camera attachment 100 or 200. The illustrated embodiment of dermal camera attachment 500 includes a controller 505, illumination system 510, an activation switch 515, a port 520, and a battery 525. The illustrated embodiment of controller 505 includes control logic 530, an illumination driver 535, and a communication interface 540.

Controller 505 may be implemented in hardware (e.g., application specific integrated circuit, field programmable gate array, etc.), as software/firmware instructions executing on a microcontroller, or a combination of both. Illumination system 510 may include a plurality of LEDs forming an LED light ring. In various embodiments, the LED sources may include white light LEDs, IR LEDs, and/or UV LEDs. In one embodiment, activation switch 515 is implemented as a magnetic switch. In one embodiment, battery 525 is implemented as a rechargeable lithium ion battery. In other embodiments, battery 525 might not be included, as described above. Port 520 may be implemented using an industry standard port (e.g., micro USB, etc.) or a propriety port. The interoperation of the functional components of dermal camera attachment 500 is described below in connection with FIG. 7.

Figure 6:
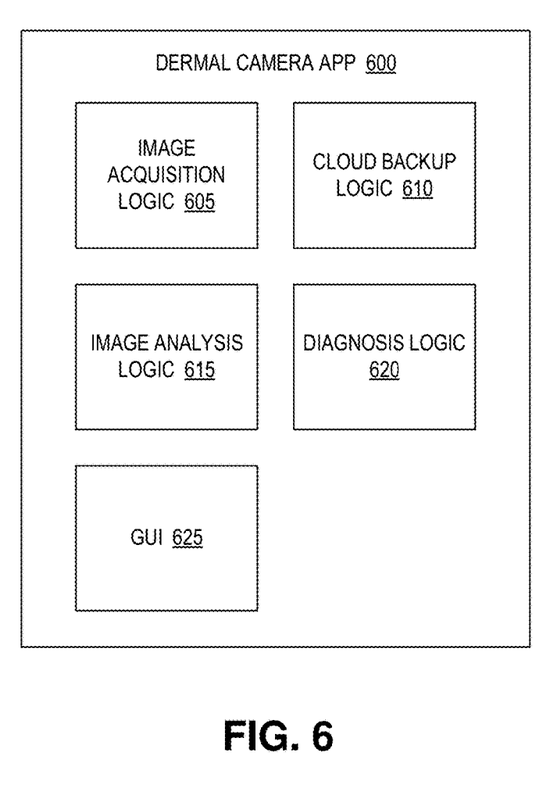
FIG. 6 is a functional block diagram illustrating software components of a dermal camera application, in accordance with an embodiment of the disclosure.

FIG. 6 is a functional block diagram illustrating components of a dermal camera application 600, in accordance with an embodiment of the disclosure. The illustrated embodiment of dermal camera application 600 includes image acquisition logic 605, cloud backup logic 610, image analysis logic 615, diagnosis logic 620, and a graphical user interface ("GUI") 625. Dermal camera application 600 represents software instructions for installing on mobile computer device 105 that interact with dermal camera attachment 500 enabling the user to access the functionality provided by dermal camera attachment 500 to acquire, archive, and analyze near field images. The interoperation of the functional components of dermal camera application 600 is described below in connection with FIG. 7.

GUI 625 provides a graphical user interface for accessing the functionality of dermal camera attachment 500. Image acquisition logic 605 uses the integrated camera of the mobile computing device to acquire near field images. Cloud backup logic 610 archives the acquired near field images to a remote database. Image analysis logic 615 analyzes the acquired near field images (e.g., define lesion boundaries, calculate lesion size, analyze lesion color, shape, etc.). Diagnosis logic 620 uses the output of image analysis logic 615 to generate a diagnosis for the patient (e.g., melanoma, benign, etc.). The diagnosis may also be based upon a large database of lesion images that have already been diagnosed and using mathematical analysis of the images to compare a patients lesion against the database.

Figure 7:
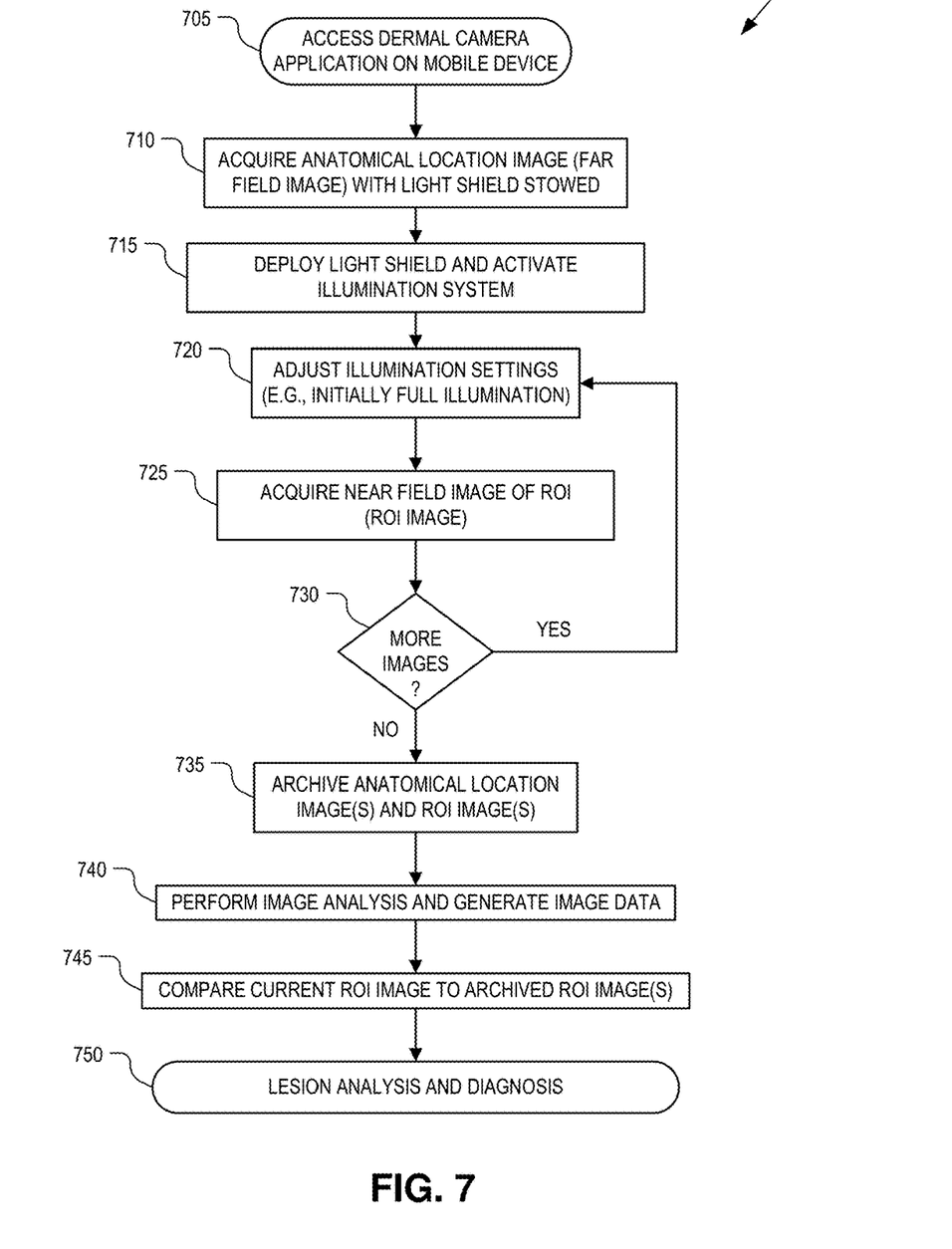
FIG. 7 is a flow chart illustrating interoperation between a dermal camera application executing on a mobile computing device and a dermal camera attachment piggybacking on the mobile computing device, in accordance with an embodiment of the disclosure.

FIG. 7 is a flow chart illustrating interoperation between dermal camera application 600 executing on mobile computing device 105 and dermal camera attachment 500 piggybacking on mobile computing device 105, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

With the dermal camera attachment (e.g., dermal camera attachment 100, 200, or 500) fitted over mobile computing device 105, the user accesses dermal camera application 600 installed on mobile computing device 105 (process block 705). From GUI 625, the user instructs image acquisition logic 605 to acquire one or more anatomical location images (e.g., far field images) with the light shield 215 in the stowed position (process block 710). The anatomical location images may provide a larger context of the anatomical location of a given lesion.

In a process block 715, the user deploys light shield 215. When light shield 215 is fully expanded, the light shield is locked in place by stops 218 in the concentric rings of light shield 215, which is able to provide a fixed offset distance for the near field images when the light shield 225 is pressed up against a region of interest. The deployed position moves magnification lens 225 into the optical path of the integrated camera and activates illumination system 220. In one embodiment, magnification lens 225 may include one or more stacked polarizing filters for filtering image light. Light shield 215 is then positioned over the region of interest ("ROI"), which may include a lesion to be imaged. Pictures can then be taken in an environment controlled for light, magnification, and focal length.

In a process block 720, control logic 530 instructs illumination drivers 535 to adjust the illumination settings for the current ROI image. As previously mentioned, illumination system 220 may include a light ring with a variety of different LED sources (e.g., white light sources, UV light sources, IR light sources, etc.). White light can be used to acquire conventional full color images. UV light can help with visualizing structures (e.g., scars) for skin surface 3D mapping (topology), colors, and pigmentation. IR light can illuminate subdermal structures (e.g, blood vessels). The light ring can produce a consistent light or stepped/directional lighting (this helps generate shadowing for textured images). A combination of different types of light sources can be used in tandem as well.

In process block 725, the current ROI image is acquired using the current illumination settings. If multiple images with different illumination settings are to be acquired (decision block 730), process 700 loops back to process block 720. Control logic 530 and/or image acquisition logic 605 can be programmed to cause illumination system 220 to exhibit a specific light pattern or illumination sequence using the different types of light sources. The integrated camera can take a series of ROI images that correspond with the specific light pattern to capture several photos of the same skin area (ROI), illuminated in different ways. Alternatively, the integrated camera can take a video and frames can be extracted from the video that correspond to the light pattern. With some additional image processing by image analysis logic 615, the 3D surface topology of the object being photographed can be reconstructed as a composite image based upon a plurality of different ROI images (near field images). This can be done by controlling the illumination direction relative to the integrated camera lens axis and measuring the shadow length and angle cast by surface features. The shadow images are created by subtracting "directional illumination" images from "full illumination" images to determine darker areas of the image that are created by shadows (as opposed to surface areas that are simply more darkly colored). A ring light implementation of illumination system 220 is a convenient arrangement for this purpose since direction can be controlled by switching on a specific LED source, or all LED source can be illuminated for full, even illumination that is brightness compensated to be approximately equal to the light output of a single LED.

In process block 735, the anatomical location image(s) and ROI image(s) are archived to a database via cloud backup logic 610. In process block 740, image analysis logic 615 analyses the ROI images of the lesion and generates image data. The image data may include a boundary identification of the lesion in the ROI of the near field image, a surface area computation, a pigment analysis, etc. In process block 745, the current near field image of the ROI is compared to archived near field images of the ROI. The relative size, along with other attributes, of the lesion identified in the current ROI image and archived ROI image can be used to generate a lesion analysis (process block 750). The lesion analysis may include a grow report or other changing characteristics. In one embodiment, the lesion analysis is displayed on a screen of mobile computing device 105 as an immediate and convenient feedback report to the user. In one embodiment, diagnosis logic 620 uses the results of the lesion analysis to generate a diagnosis for the lesion. In one embodiment, diagnosis logic 620 references a database of other lesions that have been previously diagnosed to compare against the patient's lesion to aid in the diagnosis.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The following statements provide general expressions of the disclosure herein:

A. A camera attachment apparatus for attaching to a mobile computing device having an integrated camera, the camera attachment apparatus comprising:

a housing having a shape to mount on the mobile computing device;

a slide plate disposed within the housing and having a stowed position and a deployed position;

an aperture disposed in the slide plate; and an illumination system mounted to the slide plate, wherein the slide plate is configured to align the aperture over the integrated camera when moved to the deployed position and does not obstruct the integrated camera in the stowed position.

B. The camera attachment apparatus of statement A, further comprising:

a light shield that blocks ambient light and provides a fixed offset when deployed for acquiring near field images and does not obstruct far field images when stowed for acquiring the far field images.

C. The camera attachment apparatus of statement B, wherein the light shield comprises a telescoping light shield that collapses when stowed and extends when deployed.

D. The camera attachment apparatus of statement C, wherein the light shield is mechanically engaged with the slide plate such that a rotation of the light shield drives the slide plate to the deployed position and extends the light shield.

E. The camera attachment apparatus of statement C or D, further comprising:

static plates disposed on either side of the slide plate;

a track disposed in sides of the static plates and the slide plate along which the slide plate moves relative to the static plates;

a rack gear mounted to the slide plate; and a pinion gear that engages the light shield and the rack gear, wherein a rotation of the light shield rotates the pinion gear, which drives the slide plate linearly along the track between the deployed position and the stowed position.

F. The camera attachment apparatus of any one of statements B to E, wherein the light shield comprises a disposable fixed length light shield that is stowed by removal and deployed by attaching onto the slide plate, wherein the light shield operates as a handle upon which a force applied by a user causes the slide plate to move between the deployed position and the stowed position.

G. The camera attachment apparatus of any one of statements A to F, wherein the illumination system comprises a light emitting diode ("LED") light ring including a plurality of LED sources surrounding the aperture.

H. The camera attachment apparatus of statement G, wherein a first portion of the LED sources are white light LEDs for acquiring near field color images and a second portion of the LED sources are infrared ("IR") LEDs for acquiring near field IR images.

I. The camera attachment apparatus of any one of statements A to H, further comprising:

a magnification lens mounted to the slide plate and disposed within the aperture of the slide plate, wherein the magnification lens overlays the integrated camera when the slide plate is moved to the deployed position and does not overlay the integrated camera when the slide plate is moved to the stowed position.

J. The camera attachment apparatus of any one of statements A to I, further comprising:

a circuit board mounted to the slide plate and having a cutout that surrounds the aperture, wherein the illumination system is disposed on the circuit board; and a controller disposed on the circuit board and coupled to drive and control the illumination system.

K. A dermal camera system, comprising:

a mobile computing device having an integrated camera; and either:

(i) a camera attachment apparatus according to any one of statements A-J, wherein the housing of the camera attachment apparatus is optionally mounted on to the mobile computing device; or (ii) a dermal camera attachment that mounts onto the mobile computing device, wherein the dermal camera attachment includes:

a housing having a shape to mount on the mobile computing device;

a slide plate disposed within the housing and having a stowed position and a deployed position;

an aperture disposed in the slide plate; and an illumination system mounted to the slide plate, wherein the slide plate is configured to align the aperture over the integrated camera when moved to the deployed position for acquiring near field images and does not obstruct the integrated camera in the stowed position for acquiring far field images.

L. The dermal camera system of statement K, further comprising:

a telescoping light shield that extends to block ambient light and provide a fixed offset when deployed for acquiring the near field images and does not obstruct the far field images when collapsed and stowed for acquiring the far field images.

M. The dermal camera system of statement L, further comprising:

static plates disposed on either side of the slide plate;

a track disposed in sides of the static plates and the slide plate along which the slide plate moves relative to the static plates;

a rack gear mounted to the slide plate; and a pinion gear that engages the telescoping light shield and the rack gear, wherein a rotation of the telescoping light shield rotates the pinion gear, which drives the slide plate linearly along the track between the deployed position and the stowed position.

N. The dermal camera system of any one of statements K to M, wherein the illumination system comprises a light emitting diode ("LED") light ring including a plurality of LED sources surrounding the aperture.

O. The dermal camera system of statement N, wherein a first portion of the LED sources are white light LEDs for acquiring near field color images and a second portion of the LED sources are infrared ("IR") LEDs for acquiring near field IR images.

P. The dermal camera system of statement N or O, further comprising:

a dermal camera application stored on the mobile computing device, the dermal camera application including instruction that, when executed by the mobile computing device, will cause the dermal camera system to perform operations comprising:

illuminating selected ones of the plurality of LED sources according to an illumination sequence;

acquiring a plurality of different near field images each corresponding to a different illumination setting in the illumination sequence; and generating a composite image based upon the plurality of different near field images.

Q. The dermal camera system of statement P, wherein the illumination sequence illuminates the LED sources to cast shadows on a region of interest from different directions for each of the different near field images and wherein the composite image is a three dimensional ("3D") topographical image.

R. The dermal camera system of any one of statements N to Q, further comprising a dermal camera application stored on the mobile computing device, the dermal camera application including instructions that, when executed by the mobile computing device, will cause the dermal camera system to perform operations comprising:

acquiring a current near field image of a region of interest ("ROI") including a lesion;

analyzing the current near field image to identify the lesion;

comparing the lesion identified in the current near field image of the ROI to the lesion in one or more previous near field images of the ROI;

generating a lesion analysis based at least in part on the comparing of the current near field image with the one or more previous near field images; and displaying the lesion analysis on a display of the mobile computing device.

S. The dermal camera system of any one of statements K to R, wherein the dermal camera application includes further instructions that, when executed by the mobile computing device, will cause the dermal camera system to perform additional operations comprising:

display a diagnosis of the lesion on the display of the mobile computing device based upon the lesion analysis.

T. The dermal camera system of any one of statements K to S, wherein the mobile computing device comprises a mobile phone.

U. The dermal camera system of any one of statements K to T, further comprising:

an activation switch mounted to the slide plate to generate a signal indicating whether the slide plate is in the stowed position or the deployed position; and a controller coupled to drive and control the illumination system and coupled to receive the signal from the activation switch, wherein the controller disables the illumination system when the signal indicates the slide plate is in the stowed position.

What is claimed is:

1. A camera attachment apparatus for attaching to a mobile computing device having an integrated camera, the camera attachment apparatus comprising:
    a housing having a shape to mount on the mobile computing device;
    a slide plate disposed within the housing and moveable between a stowed position and a deployed position;
    a light shield mechanically engageable with the slide plate;
    an aperture disposed in the slide plate; and
    an illumination system mounted to the slide plate,
    wherein the slide plate is configured to align the aperture over the integrated camera when moved to the deployed position and remove the aperture from view of the integrated camera when moved to the stowed position while the housing is mounted to the mobile computing device.

2. The camera attachment apparatus of claim 1,
    wherein the light shield blocks ambient light from interfering with near field images and provides a fixed offset from the integrated camera when deployed for acquiring the near field images and prevents obstruction of far field images when stowed for acquiring the far field images.

3. The camera attachment apparatus of claim 2, wherein the light shield comprises a telescoping light shield that collapses when stowed and extends when deployed.

4. The camera attachment apparatus of claim 3, wherein the light shield is mechanically engaged with the slide plate such that a rotation of the light shield drives the slide plate to the deployed position and extends the light shield.

5. The camera attachment apparatus of claim 3, further comprising:
    static plates disposed on either side of the slide plate;
    a track disposed in sides of the static plates and the slide plate along which the slide plate moves relative to the static plates;
    a rack gear mounted to the slide plate; and
    a pinion gear that engages the light shield and the rack gear, wherein a rotation of the light shield rotates the pinion gear, which drives the slide plate linearly along the track between the deployed position and the stowed position.

6. The camera attachment apparatus of claim 2, wherein the light shield comprises a disposable fixed length light shield that is stowed by removal and deployed by attaching onto the slide plate, wherein the light shield operates as a handle upon which a force applied by a user causes the slide plate to move between the deployed position and the stowed position.

7. The camera attachment apparatus of claim 1, wherein the illumination system comprises a light emitting diode ("LED") light ring including a plurality of LED sources surrounding the aperture.

8. The camera attachment apparatus of claim 7, wherein a first portion of the LED sources are white light LEDs for acquiring near field color images and a second portion of the LED sources are infrared ("IR") LEDs for acquiring near field IR images.

9. The camera attachment apparatus of claim 1, further comprising:
    a magnification lens mounted to the slide plate and disposed within the aperture of the slide plate, wherein the magnification lens overlays the integrated camera when the slide plate is moved to the deployed position and does not overlay the integrated camera when the slide plate is moved to the stowed position.

10. The camera attachment apparatus of claim 1, further comprising:
    a circuit board mounted to the slide plate and having a cutout that surrounds the aperture, wherein the illumination system is disposed on the circuit board; and
    a controller disposed on the circuit board and coupled to drive and control the illumination system.

11. A dermal camera system, comprising:
    a mobile computing device having an integrated camera;
    a dermal camera attachment that mounts onto the mobile computing device, wherein the dermal camera attachment includes:
    a housing having a shape to mount on the mobile computing device;
    a slide plate disposed within the housing and having a stowed position and a deployed position;
    a light shield mechanically engageable with the slide plate;
    an aperture disposed in the slide plate; and
    an illumination system mounted to the slide plate,
    wherein the slide plate is configured to align the aperture over the integrated camera when moved to the deployed position for acquiring near field images and remove the aperture from view of the integrated camera when moved to the stowed position while the housing is mounted to the mobile computing device.

12. The dermal camera system of claim 11, wherein the light shield comprises:
   a telescoping light shield that extends to block ambient light from interfering with the near field images and provides a fixed offset from the integrated camera when deployed for acquiring the near field images and prevents obstruction of the far field images when collapsed and stowed for acquiring the far field images.

13. The dermal camera system of claim 12, further comprising:
   static plates disposed on either side of the slide plate;
   a track disposed in sides of the static plates and the slide plate along which the slide plate moves relative to the static plates;
   a rack gear mounted to the slide plate; and
   a pinion gear that engages the telescoping light shield and the rack gear, wherein a rotation of the telescoping light shield rotates the pinion gear, which drives the slide plate linearly along the track between the deployed position and the stowed position.

14. The dermal camera system of claim 11, wherein the illumination system comprises a light emitting diode ("LED") light ring including a plurality of LED sources surrounding the aperture.

15. The dermal camera system of claim 14, wherein a first portion of the LED sources are white light LEDs for acquiring near field color images and a second portion of the LED sources are infrared ("IR") LEDs for acquiring near field IR images.

16. The dermal camera system of claim 14, further comprising:
   a tangible machine readable storage medium disposed within the mobile computing device and storing a dermal camera application including instructions that, when executed by the mobile computing device, cause the dermal camera system to perform operations comprising:
      illuminating selected ones of the plurality of LED sources according to an illumination sequence;
      acquiring a plurality of different near field images each corresponding to a different illumination setting in the illumination sequence; and
      generating a composite image based upon the plurality of different near field images.

17. The dermal camera system of claim 16, wherein the illumination sequence illuminates the LED sources to cast shadows on a region of interest from different directions for each of the different near field images and wherein the composite image is a three dimensional ("3D") topographical image.

18. The dermal camera system of claim 14, further comprising a tangible machine readable storage medium disposed within the mobile computing device and storing a dermal camera application including instructions that, when executed by the mobile computing device, will cause the dermal camera system to perform operations comprising:
   acquiring a current near field image of a region of interest ("ROI") including a lesion;
   analyzing the current near field image to identify the lesion;
   comparing the lesion identified in the current near field image of the ROI to the lesion in one or more previous near field images of the ROI;
   generating a lesion analysis based at least in part on the comparing of the current near field image with the one or more previous near field images; and
   displaying the lesion analysis on a display of the mobile computing device.

19. The dermal camera system of claim 18, wherein the dermal camera application includes further instructions that, when executed by the mobile computing device, will cause the dermal camera system to perform additional operations comprising:
   display a diagnosis of the lesion on the display of the mobile computing device based upon the lesion analysis.

20. The dermal camera system of claim 11, wherein the mobile computing device comprises a mobile phone.

21. The dermal camera system of claim 11, further comprising:
   an activation switch mounted to the slide plate to generate a signal indicating whether the slide plate is in the stowed position or the deployed position; and
   a controller coupled to drive and control the illumination system and coupled to receive the signal from the activation switch, wherein the controller disables the illumination system when the signal indicates the slide plate is in the stowed position.

22. A camera attachment apparatus for attaching to a mobile computing device having an integrated camera, the camera attachment apparatus comprising:
   a housing having a shape to mount on the mobile computing device;
   a slide plate disposed within the housing and moveable between a stowed position and a deployed position;
   an aperture disposed in the slide plate, wherein the slide plate is configured to align the aperture over the integrated camera when moved to the deployed position and prevents obstruction of the integrated camera when moved to the stowed position;
   an illumination system mounted to the slide plate; and
   a telescoping light shield mechanically engaged with the slide plate such that a rotation of the light shield drives the slide plate to the deployed position and extends the light shield.

* * * * *